Jan. 20, 1959  C. P. SMITH  2,870,406
DEVICE FOR VOLTAGE MEASUREMENT
Filed June 3, 1957  4 Sheets-Sheet 1

INVENTOR.
CALDWELL P. SMITH
BY
ATTORNEYS

Jan. 20, 1959 C. P. SMITH 2,870,406
DEVICE FOR VOLTAGE MEASUREMENT
Filed June 3, 1957 4 Sheets-Sheet 2
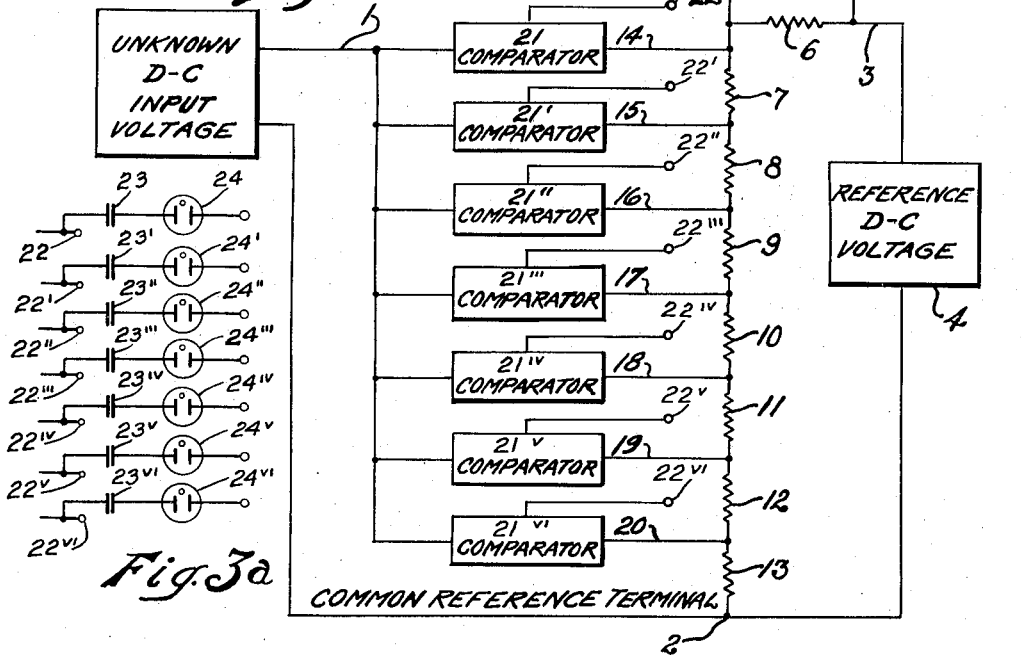
*Fig. 3*
*Fig. 3a*
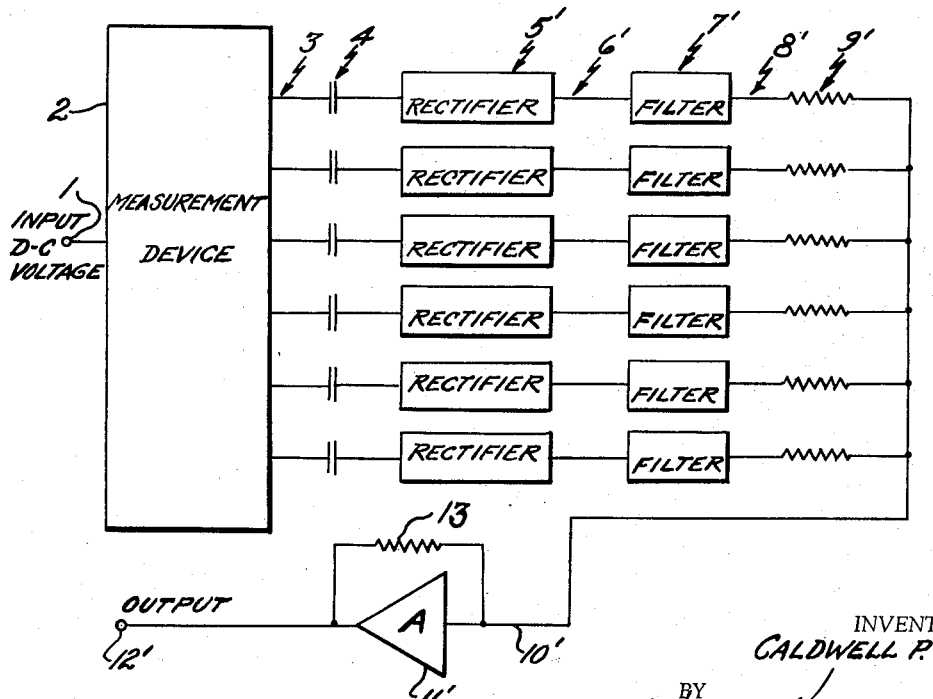
*Fig. 5*
INVENTOR.
CALDWELL P. SMITH
BY
ATTORNEYS Jan. 20, 1959 C. P. SMITH 2,870,406
DEVICE FOR VOLTAGE MEASUREMENT
Filed June 3, 1957 4 Sheets-Sheet 3
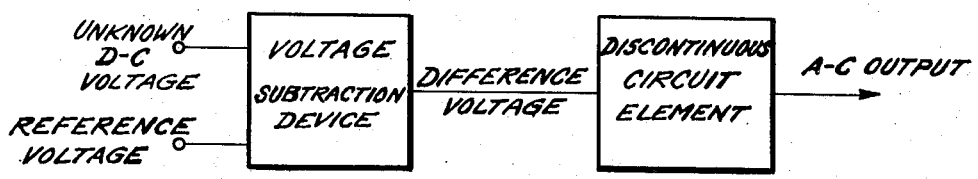
Fig. 4a A COMPARATOR ELEMENT
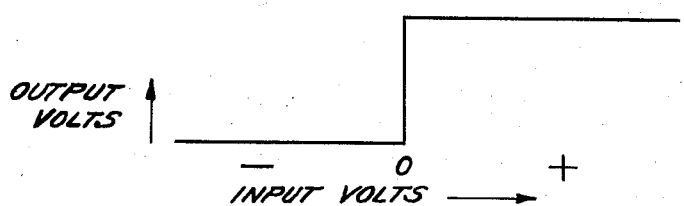
Fig. 4b INPUT-OUTPUT CHARACTERISTICS OF DISCONTINUOUS CIRCUIT ELEMENT
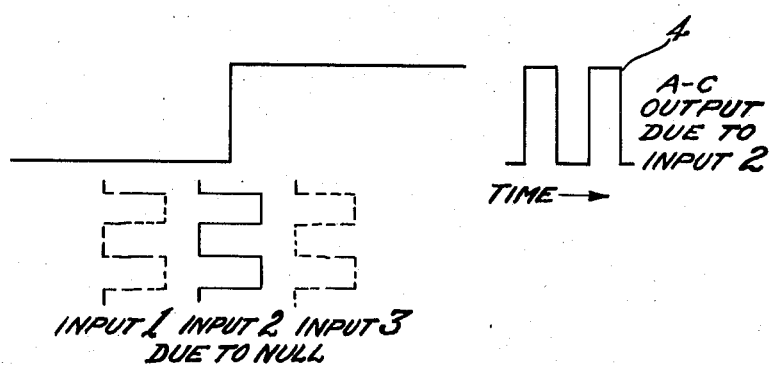
Fig. 4c RESPONSE OF DISCONTINUOUS CIRCUIT ELEMENT TO A "NULL" SIGNAL (INPUT 2)
INVENTOR.
CALDWELL P. SMITH
BY
ATTORNEYS

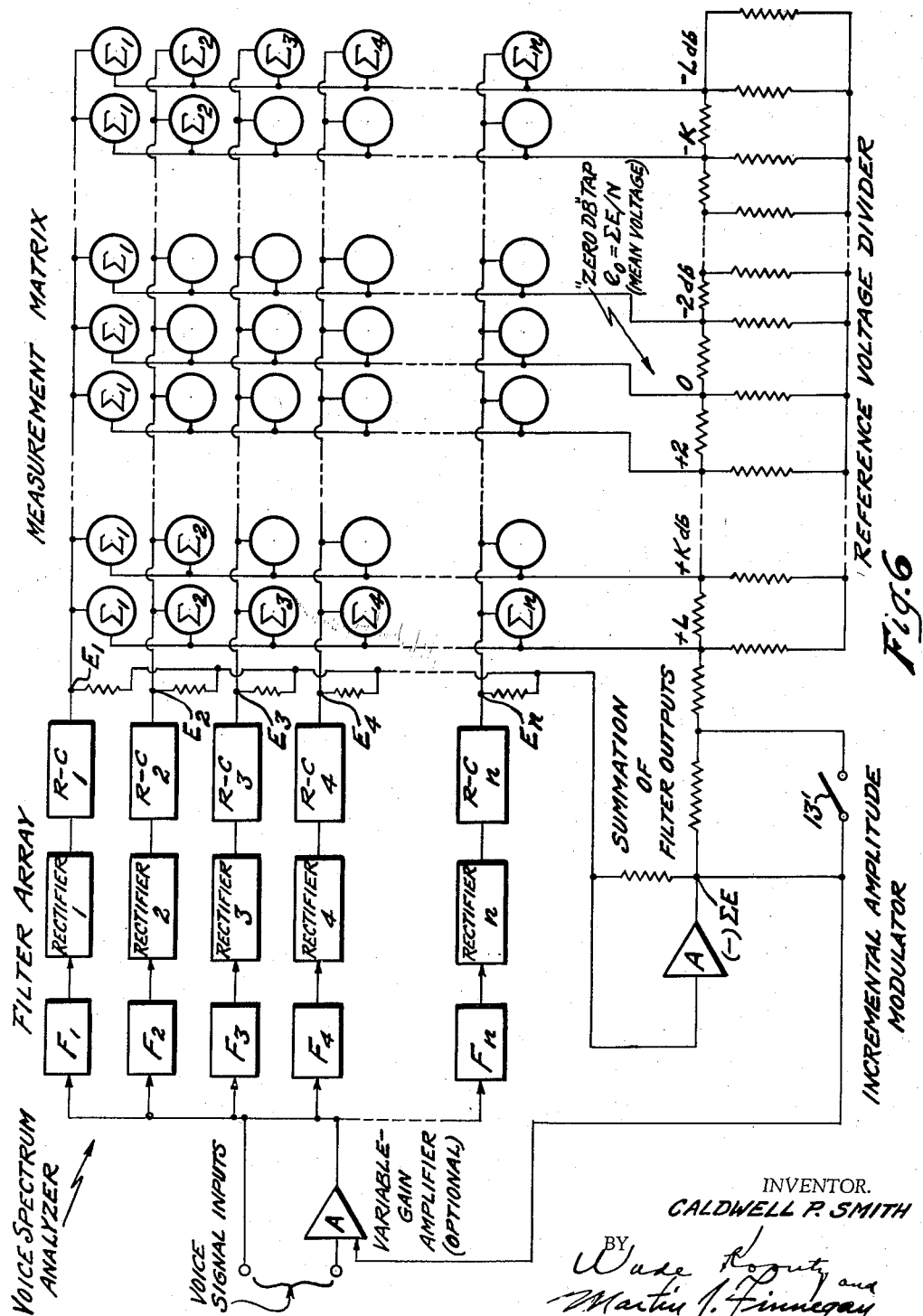

United States Patent Office 2,870,406
Patented Jan. 20, 1959

2,870,406

DEVICE FOR VOLTAGE MEASUREMENT

Caldwell P. Smith, Bedford, Mass., assignor to the United States of America as represented by the Secretary of the Air Force Application June 3, 1957, Serial No. 663,316

3 Claims. (Cl. 324—99)

(Granted under Title 35, U. S. Code (1952), sec. 266)

The invention described herein may be manufactured and used by or for the United States Government for governmental purposes without payment to me of any royalty thereon.

This invention relates to the analysis of patterns of voltage distribution, and to the utilization of such analysis, either in the form of a visual display of the distribution pattern, or otherwise.

Physical phenomena are often manifested by characteristic patterns of distribution of measurable quantities such as voltage, pressure, temperature, mass, etc., which patterns are indicative of the quantities under analysis. For example, complex auditory signals such as speech and music are accurately described by their frequency spectra. An array of frequency-band filters will specify such signals by generating an array of voltages specifying the spectra patterns.

In my co-pending application, Ser. No. 568,688, filed February 29, 1956, entitled: "Analysis of Voltage Distribution," there is disclosed a method of voltage analysis employing an electronic matrix for measuring voltage distribution across an array of frequency-band filters, operation being such that each voltage manifestation of the array is measured in terms of its ratio with respect to the mean or average voltage of the array, as a whole.

The present invention utilizes an electronic correlation technique which functions to compare each individual voltage manifestation with a preestablished standard reference voltage signal, or array of signal, rather than with an average value produced in the course of the measurement operation itself, as in my co-pending application above-identified. This new correlation technique is applicable not only to an electronic matrix, or filter array, such as that of my co-pending application, but also to many other measuring and computing projects as, for example, projects for measuring and quantizing D.-C. voltage levels, for transforming D.-C. voltage signals to analogous A.-C. signals, and for introducing non-linear components into circuit parameters as an aid to the solution of voltage allocation problems.

In one method of applying the present invention to the task of determining the voltage level of unknown D.-C. voltage signals, the unknown voltage signal is correlated by comparing it simultaneously with an array or ensemble of reference voltage signals. The array of reference voltages are derived from a standard reference voltage source, and are related to the common source by fixed, constant coefficients of proportionality, or ratios. In my invention, the particular reference voltage most nearly equal in amplitude to the unknown voltage is automatically identified, thereby identifying the coefficient or ratio that relates the unknown D.-C. voltage and the standard reference voltage. If, however, the unknown voltage is outside the range of measurement, no correlation is made. The standard reference voltage may be derived from a fixed source, such as a battery, a voltage reference tube, or a primary cell. Alternatively, the unknown voltage may be measured as a ratio with respect to a varying voltage, as used in the electronic matrix described in said co-pending application. In each case, the unknown voltage is measured as a ratio with respect to a standard reference voltage and the ratio is measured on a discrete, rather than a continuous scale.

The invention also includes the structural organization of electrical and electronic components disclosed herein as representative of desirable means for putting into practice the novel operational methods described.

These and other characteristics and objects of the invention will be understood upon reference to the following detailed description of the embodiments illustrated in the accompanying drawings wherein:

Fig. 3 is a diagram of circuitry components interrelated to constitute a system whose structural composition facilitates practice of the correlating technique of the invention;

Fig. 3(a) is a supplement to the diagram shown in Fig. 3;

Fig. 4(a) is a block diagram of one of the voltage comparator elements utilized in the circuitry of Fig. 3;

Figs. 4(b) and 4(c) are voltage waveform diagrams pertinent to the operation of the circuitry of Fig. 4(a);

Fig. 5 illustrates circuitry for applying the invention as a non-linear circuit element; and Fig. 6 is a diagrammatic representation of the invention as incorporated in voltage measuring elements arranged in electronic matrix form.

Figure 1:
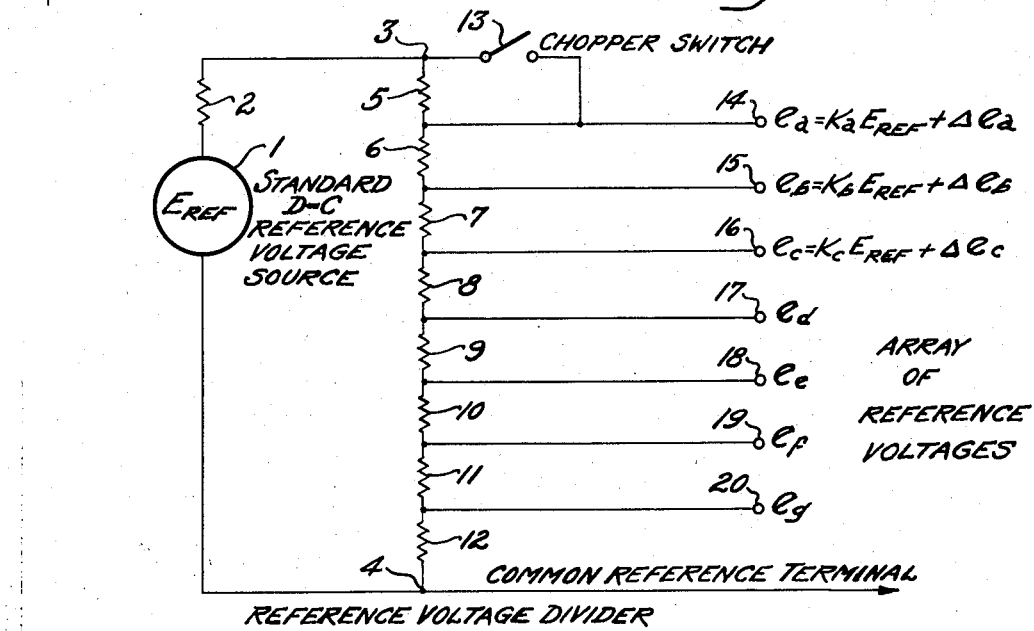
Fig. 1 is a diagram showing a set of voltage divider units, connected across a pre-established source of reference voltages, and positioned for comparison with an array of unknown voltages by use of the correlating technique of the present invention.

Fig. 1 illustrates the circuit means employed in my invention to derive an array of reference voltages simultaneously from a standard reference voltage source. The mode of operation is as follows: a standard D.-C. reference voltage source 1 having internal resistance 2 is connected across terminals 3 and 4, impressing a voltage $E_{ref}$ across these terminals. Also connected across these terminals is a reference voltage divider, consisting of resistors 5, 6, 7, . . ., 12, connected in series. Voltage taps 14, 15, 16, . . ., 20 are electrical connections to the junction points between the respective resistors. The particular number of resistors employed in a reference voltage divider for a particular application will depend on the voltage range and the voltage increment that is to be measured, using design criteria that will be presented in this description; the particular number of resistors shown and the mode of operation to be described are typical of the various possible configurations.

A chopper switch 13 is connected in shunt with the first resistor 5 of the voltage divider network, and periodically short-circuits said resistor each time switch 13 closes. The chopper switch 13 is actuated by means of a vibrating reed, a motor driven cam, or other actuating source (not shown) that periodically causes switch 13 to open and close. Alternatively, chopper switch 13 may be an electronic switch actuated by an A.-C. signal.

At terminals 14, 15, 16, . . ., 20 appear voltages $e_a$, $e_b$, $e_c$, . . ., $e_g$. These voltages have two components, a D.-C. or steady-state component, and an A.-C. or alternating component of amplitude due to the periodic opening and closing of chopper switch 13.

The design parameters are so chosen that the total resistance of the voltage divider $$R_{tot} = R_5 + R_6 + R_7 + \ldots R_{12}$$

is large in comparison with the source resistance $R_2$ $$R_{tot} \gg R_2$$

i. e., $E_{ref}$ does not vary due to the varying load caused by the action of the chopper switch. Therefore the voltage at terminal 14 will rise to the value $E_{ref}$ when switch 13 closes, and will fall to the value $$e_a(\text{sw. open}) = K_a E_{ref} = E_{ref} \frac{R_{tot} - R_5}{R_{tot}}$$

when switch 13 opens. The coefficients of proportionality $K_a$, $K_b$, $K_c$, $K_d$, . . . etc. are constants relating the voltage levels $e_a$ on terminal 14, $e_b$ on terminal 15, etc. to the common reference voltage $E_{ref}$ for the condition that switch 13 is open.

The set of coefficients $K_a$, $K_b$, $K_c$, . . . etc. are measures of the steady-state or D.-C. component of voltage appearing at terminals 14, 15, 16, . . . etc. The periodic opening and closing of chopper switch 13 superimposes an A.-C. component on the D.-C. level, the A.-C. component being $$\Delta e_a = e_a(\text{switch closed}) - e_a(\text{switch open})$$

$$\Delta e_b = e_b(\text{switch closed}) - e_b(\text{switch open})$$

etc.

The ratio of the voltage at terminal 14 when switch 13 is open, to the voltage at terminal 14 when switch 13 is closed $$\frac{e_a \text{ (switch open)}}{e_a \text{ (switch closed)}} = \frac{R_{tot} - R_5}{R_{tot}}$$

Expressed in decibels, this measure becomes $$M_{(db)} = 20 \log_{10} \frac{R_{tot} - R_5}{R_{tot}}$$

this expression establishing the voltage increment, expressed in decibels, by which the voltage appearing at terminal 14 changes in amplitude due to the action of chopper switch 13. This modulation increment is one of the important design parameters of my invention. It is important because the change in amplitude of each of the reference voltages, due to the action of the chopper switch, establishes an "amplitude scanning" of the reference voltages. Chopper switch 13 creates the same modulation increment, expressed as a ratio, which is to say, the same voltage increment in decibels, for each reference voltage derived from the reference voltage divider. For example, the voltage at terminal 15 is $$e_b(\text{switch open}) = K_b E_{ref} = E_{ref} \frac{R_{tot} - (R_5 + R_6)}{R_{tot}}$$

and with switch 13 closed:

$$e_b(\text{switch closed}) = E_{ref} \frac{R_{tot} - R_5 - R_6}{R_{tot} - R_5}$$

and the ratio of these two voltages is $$\frac{e_b(\text{switch open})}{e_b(\text{switch closed})} = \frac{R_{tot} - R_5}{R_{tot}}$$

or precisely the same ratio as that of the voltage $e_a$ for the condition of switch open and closed. The switch 13, by periodically short-circuiting resistor 5 superimposes an incremental amplitude modulation on each of the reference voltages of the array appearing at the terminals of the voltage divider. The amplitude increment in decibels is identical at each of the voltage taps:

$$\frac{\Delta e_a}{K_a E_{ref}} = \frac{\Delta e_b}{K_b E_{ref}} = \frac{\Delta e_c}{K_c E_{ref}}$$

etc.

The amplitude increment is established by the size of resistor 5 in proportion to the total resistance of the voltage divider, and therefore can be assigned any arbitrary value by appropriate choice of resistors.

Similarly, the coefficients $K_a$, $K_b$, $K_c$, etc. can be assigned values at will, by choice of size of resistors 6, 7, 8, 9, etc. in relation to the reference voltage divider.

Figure 2:
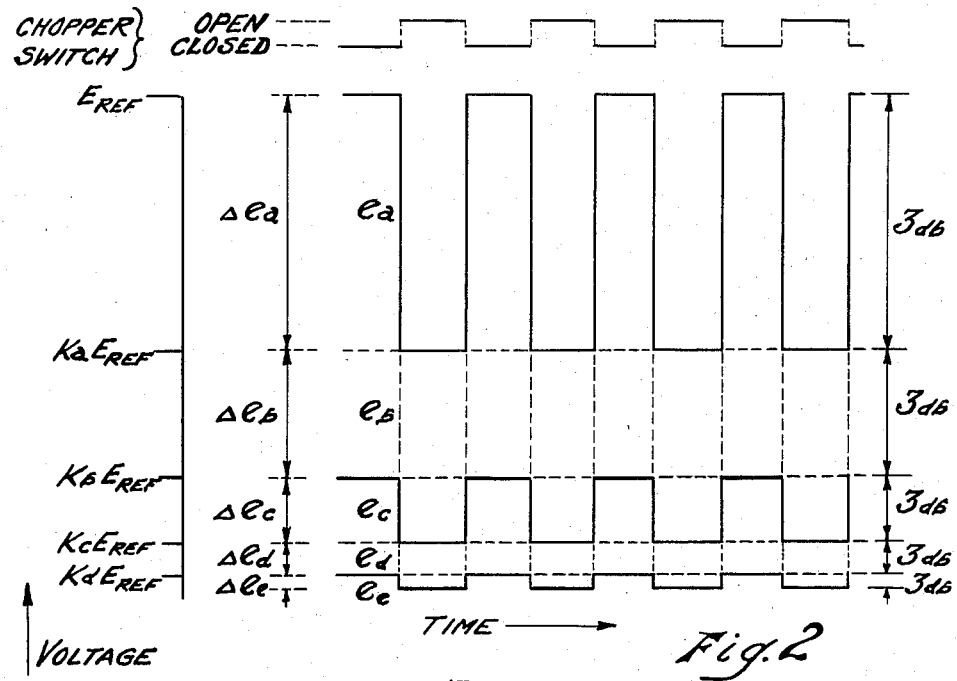
Fig. 2 is a pictorial representation of the voltage waveforms manifested as the voltage ensemble is "scanned out" at the various terminals in succession.

By choosing resistors such that $$\frac{K_b}{K_a} = \frac{K_c}{K_b} = \frac{K_d}{K_c} \text{ etc.} = \frac{R_{tot} - R_5}{R_{tot}}$$

the array of reference voltages are arranged to form a continuous scale of voltage, with each of the reference voltages oscillating in amplitude over a range that precisely adjoins the range of the adjacent higher and lower reference voltages, without overlap or holes in the amplitude scale established by the ensemble of reference voltage signals. This description may be understood more clearly in terms of a decibel scale of amplitude. Each reference voltage oscillates in amplitude between two levels separated by a fixed increment in decibels, for example, 3 db. That is, the voltage level is at a particular amplitude when switch 13 is open, and then increases precisely 3 db (or some other increment that may be incorporated in the design) when switch 13 closes. If the amplitude coefficients were established so that the difference between voltage levels on adjacent terminals of the voltage divider, with the switch non-operative is also 3 db, the amplitude modulation will have the effect of causing each reference voltage to "scan" or traverse an amplitude increment of 3 db, and the voltage levels "scanned" by adjacent reference voltages are precisely contiguous. This design spaces the array of reference voltages on a logarithmic or decibel scale, with the ratio of adjacent reference voltages (that is to say, the increment expressed in decibels) precisely equal to the amplitude increment generated by the action of the chopper switch. Figure 2 illustrates the voltage waveforms in a representative arrangement, showing the voltage ranges "scanned out" at the various terminals to be precisely adjacent, and together forming a continuous scanning of the range of amplitude covered by the ensemble of voltages. This technique, of dividing the voltage range into small increments and "scanning" each incremental range is embodied in my invention, and is shown in Figure 3.

Figure 3 illustrates my invention in its basic form. The mode of operation is as follows: the unknown D.-C. input voltage to be measured is impressed across terminals 1 and 2. Terminal 1 is a common input terminal to a set of voltage comparator means 21, and terminal 2 is a common connection. A D.-C. reference voltage source 4 is connected across terminals 2 and 3; the D.-C. reference voltage source may be fixed, such as a primary cell, battery, or voltage reference tube, or may be a varying voltage. If the reference voltage is varying in amplitude, the chopper switch must operate at a frequency that is suitably high with respect to the rate of change of the reference voltage.

The D.-C. reference voltage source is connected to chopper switch 5 in shunt with resistor 6, that is the initial resistor in a voltage divider consisting of resistors 7, 8, 9, . . ., 13 connected in series. The junction points between the resistors, terminals 14, 15, 16, . . ., 20 are connected as input terminals to voltage comparator means 21, 21', 21'', . . . . The voltage comparator means 21, 21', etc. constitute means for comparing the unknown D.-C. input voltage with each voltage of the reference array generated by the combination consisting of the D.-C. reference voltage source, the reference voltage divider, and the chopper switch. My invention is not limited to the particular number of circuit means shown in Figure 3, and the particular number of circuit means employed in a particular application is dictated by the voltage range and voltage increment to be measured. For example, a design in which ten comparators are utilized, and a two decibel voltage increment, will provide a measurement of the ratio of unknown voltage to reference voltage over a twenty decibel range, to an accuracy of plus or minus one decibel. Twenty comparators, and a one decibel increment, would provide a measurement of the same twenty decibel range, but to an accuracy of plus or minus one-half decibel.

Each voltage comparator 21 consists of two circuit means in series, as shown in Figure 4(a). The first circuit means is a voltage subtraction means, that measures the difference between the unknown voltage and the reference voltage, that is, subtracts the reference voltage from the unknown voltage. If the reference voltage is equal in amplitude to the unknown voltage, or if equality occurs within the range of amplitude "scanned" by the reference voltage, a null is generated, since subtraction of two equal quantities equals zero. However, if the unknown D.-C. voltage and the reference voltage are unequal, within the amplitude range "scanned" by the reference voltage signal, no null is generated, and the output from the subtraction circuit has a positive or negative polarity, depending on which of the two voltages is larger.

The output terminal of each voltage subtraction means is connected as input to a circuit means having a discontinuous input-output characteristic. The transfer characteristic of this circuit means is shown in Figure 4(b). It is characterized by an output that has zero slope for input signals of negative polarity. At or near zero input volts, the output abruptly switches to full voltage and does not increase (has zero slope) for more positive input voltages. There are numerous examples of such circuit means, for example, the Schmitt trigger circuit, feedback amplifiers using non-linear elements in the feedback loop, magnetic devices, or high-gain D.-C. amplifiers operated with large input signals, so that the output is driven into the cut-off region or the saturation region.

The discontinuous circuit means acts as a null detector, converting a null to an A.-C. output voltage of unit amplitude (the A.-C. output voltage has an amplitude that is independent of the amplitude of the voltages generating the null, and is a function only of the presence or absence of the null). The mode of operation of the discontinuous circuit element means is illustrated in Figure 4(c). In this illustration, voltage waveform 1 illustrates the output signal from a voltage subtraction circuit means, for which the two input voltages are unequal in amplitude. The voltage waveform "scans" a sector of the transfer characteristic for which there is zero slope, therefore no output voltage is generated. Voltage waveform 2 illustrates the output signal from a voltage subtraction circuit means for which the two input signals are equal in amplitude. This signal "scans" the discontinuity of the transfer characteristic, thus generating the output voltage waveform 5. Voltage waveform 3 does not generate an A.-C. output voltage, because it also scans a region of zero slope of the transfer characteristic. Thus the combination of circuit means shown in Figure 3 establishes a mode of operation for which an A.-C. output voltage will be generated in the output of the comparator means 21 for which the unknown D.-C. input voltage is equal in amplitude to the reference voltage, that is, equality lies within the amplitude range "scanned" by the incremental amplitude modulation of the reference voltage. One and only one of the comparator circuit means 21 will exhibit such an A.-C. output signal, since there is no overlapping of the amplitude ranges scanned by the array of reference voltages.

The particular comparator circuit means 21 exhibiting an A.-C. output voltage automatically identifies the particular amplitude coefficient K that relates the unknown voltage to the D.-C. reference voltage source, thereby identifying the ratio that relates the unknown voltage and the reference voltage source.

The voltage subtraction circuit means shown in Figure 4(a) can have many alternative circuit structures. Subtraction of two voltages having similar polarity is achieved, in general, by inverting the polarity of one of the two, and then adding, thus achieving the net result of subtraction. Conventional D.-C. phase inverter circuits and voltage addition circuits will thus fulfill this function.

Alternatively, a D.-C. amplifier with differential inputs is another conventional circuit means for voltage subtraction. By using such an amplifier with extremely high voltage gain, both of the circuit means shown in Figure 4(a) can be realized in the single unit, by using the amplifier in a non-linear manner.

D.-C. amplifiers with differential inputs and very high gains are readily available from commercial sources, for use in analog computers. These units commonly have voltage gains of from 10,000 to 30,000, and are ordinarily used with feedback to reduce and stabilize the gain. If, however, such an amplifier is used without feedback, it will have a transfer characteristic such as that shown in Figure 4(b), since only a few millivolts of input voltage will suffice to drive the output voltage from cut-off to saturation. Therefore, a high-gain D.-C. amplifier with differential inputs will provide both of the circuit functions designated in Figure 4(a); the differential inputs will provide subtraction of the D.-C. input signals; the very high gain will cause the amplifier to act as a discontinuous circuit element for input voltages that differ by more than a few millivolts. Thus such an amplifier will provide the function of comparator 21 shown in Figure 3, for measurement of voltage levels that are significantly larger than the linear range of such amplifiers. Alternatively, separate circuit means, such as those previously mentioned, can be used to provide the functions of voltage subtraction, and the discontinuous input-output transfer characteristic.

This invention is readily incorporated in the electronic matrix described in my co-pending application, by substituting a combination of circuit means as shown in Figure 3 as the elements of one row of the electronic matrix, and similar combinations as the other rows of the matrix. In this application, a comparator having the functions designated for Figure 4(a) constitutes each cell of the matrix. The use of this invention to constitute the matrix, in place of the alternative circuit means described in my co-pending application will have a mode of operation rendering the matrix cells precisely contiguous along the amplitude dimension of the matrix; this mode of operation derives from the same considerations described herein, principally resulting from the use of the chopper switch and reference voltage divider to generate an array of reference voltages that "scan" precisely contiguous increments of amplitude. (Incorporation in the electronic matrix is shown in Figure 6.) The A.-C. output terminals 22, 22', 22", etc. of Figure 3 can be connected directly to a corresponding series of indicators 24, 24', 24", etc. to provide a visual display of the numerical value of the ratio $K_a$, $K_b$, $K_c$, etc. that relates the unknown D.-C. input voltage and the reference D.-C. voltage. A neon bulb of the "24" series is connected to each output terminal through a D.-C. blocking capacitor 23, 23', 23", etc. will ignite when an A.-C. output signal occurs, thus providing a visual display and visually identifying the particular ratio relating the two voltages.

My invention will also function as a non-linear circuit element. Figure 5 illustrates the combination of circuit means to achieve a non-linear input-output characteristic. The mode of operation is as follows: an input voltage 1 is connected to measurement circuit means 2, that consists of the combination of circuit means shown in Figure 3. The output terminals 3, 3', 3", correspond to the outputs designated as 22, 22', 22", . . . etc. in Figure 3; the mode of operation of the measurement means 2 being that previously described, an A.-C. output voltage will appear at one of the terminals 3, and the particular terminal identifies the ratio relating input voltage 1 and a standard reference voltage source incorporated in measurement circuit 2.

Output terminals 3, 3', 3", . . . etc. are connected through D.-C. blocking capacitors 4 to rectifiers 5, whose output terminals 6 are connected through filters 7 to D.-C. output voltage terminals 8. These circuit means will rectify and smooth the A.-C. output voltages from 3, 3′, 3″, thereby causing D.-C. output voltages to appear at terminals 8, 8′,8″, . . . etc. A D.-C. output will appear at one of the terminals, the particular terminal identifying the voltage ratio that relates the input D.-C. voltage 1 to the standard reference voltage source incorporated in measurement means 2.

Output terminals 8, 8′, 8″, . . . etc., are connected through weighting resistors 9 to the common input terminal 10 of D.-C. amplifier 11, said combination, together with feedback resistor 13, comprising a voltage summation circuit.

The D.-C. voltage appearing at any one of the terminals 8 will cause a corresponding D.-C. output voltage to appear at terminal 12. The constant of proportionality between the input voltage at terminal 8 and the output at terminal 12 can be assigned any desired value, by choice of the value of adding resistor 9, in relation to the rest of the ensemble of resistors in the summation network. Therefore the output voltage at terminal 12 can be made to follow any desired law with respect to the input voltage at terminal 1, such as a square-law, logarithmic, cubic, or other non-linear relationship. In each case the transformation is on a quantized, rather than a continuous scale, due to the quantization inherent in circuit means 2. For example, if the conductances 9, 9′, 9″, etc. are ordered in the relationship 1, 2, 3, 4, . . . the output voltage signal at terminal 12 will vary on a quantized decibel scale in proportion to the input D.-C. voltage at terminal 1. This mode of operation derives directly from the logarithmic scale of measurement of the reference voltage divider contained in circuit means 2.

Fig. 6 shows the invention embodied in an electronic matrix arranged to measure continuously the ratio of each individual voltage output to the mean, or average, voltage output of the complete voice spectrum. A set of contiguous band filter channels $F_1$ to $F_n$ receive the voice signal input, and rectifiers 1 to $n$, together with smoothing "R–C" networks 1 to $n$, operate to convert the signal in each frequency band to a D.-C. signal, which individual D.-C. signals are then individually compared to the mean, or average, voltage output in a measurement matrix which includes a decibel amplitude scale conforming to the voltage distribution as determined by the arrangement of the reference voltage divider units included in each branch of the measurement matrix. The taps on the voltage divider (spaced in equal 2 db increments) cause generation of an array of voltages proportional to the mean voltage output of the filter array. Operation of chopper switch 13′ causes an A.-C. carrier signal (of 2 db amplitude modulation increments) to be imposed upon the reference voltage array. A gain-control feedback to the input amplifier circuit may also be included, as shown.

What I claim is:

1. In a electrical measurement, an unknown D.-C. input voltage signal, a standard D.-C. reference voltage signal, means for deriving an array of alternating reference voltage signals having mean amplitudes proportional to said standard D.-C. reference voltage signal in precise ratios, and having precise, known ranges of instantaneous amplitudes, means for constraining the instantaneous amplitude ranges of said array of reference voltages to form a contiguous set of amplitude ranges, means for simultaneously comparing said array of alternating reference voltage signals with said unknown input D.-C. voltage signal, and means for automatically determining that reference voltage whose instantaneous amplitude traverses the amplitude level of said unknown input voltage signal, thereby identifying the ratio of amplitude of said unknown input D.-C. voltage signal to said standard D.-C. reference voltage signal within precise limits.

2. In electrical measurement, an unknown D.-C. input voltage signal, a standard D.-C. reference voltage signal, means for deriving an array of alternating reference voltage signals having mean amplitudes proportional to said standard D.-C. reference voltage signal in precise ratios, and having precise, known ranges of instantaneous amplitudes, means for constraining the instantaneous amplitude ranges of said array of reference voltages to form a contiguous set of amplitude ranges, means for simultaneously comparing said array of alternating reference voltage signals with said unknown input D.-C. voltage signal, and means for automatically determining that reference voltage whose instantaneous amplitude traverses the amplitude level of said unknown input voltage signal, thereby identifying the ratio of amplitude of said unknown input D.-C. voltage signal to said standard D.-C. reference voltage signal within precise limits, and means for visual display of the value of said ratio.

3. In electrical measurement, an unknown D.-C. input voltage signal, a standard D.-C. reference voltage signal, a voltage divider having many voltage taps connected to said standard D.-C. reference voltage signal, thereby establishing an array of reference signals proportional in precise ratios to said standard D.-C. reference voltage signal, a chopper switch connected in shunt with a resistor, said combination of chopper switch and resistor being connected in series with said reference voltage divider, thereby imposing an incremental A.-C. modulation on said array of reference voltages, means for subtracting each reference voltage signal from said unknown D.-C. input voltage signal, a discontinuous circuit element means connected to the output from each subtracting means, thereby generating an A.-C. output voltage from that combination for which said unknown D.-C. input voltage is equal in amplitude within precise limits to that reference voltage, thereby identifying the ratio of amplitude of said unknown D.-C. input voltage signals to said standard D.-C. reference voltage signal within precise limits.

References Cited in the file of this patent

UNITED STATES PATENTS

| | | |
|---|---|---|
| 2,556,200 | Lesti | June 12, 1951 |
| 2,701,303 | Wells | Feb. 1, 1955 |